(12) United States Patent
Gabardo et al.

(10) Patent No.: US 11,181,500 B2
(45) Date of Patent: Nov. 23, 2021

(54) TEXTURED ELECTRODES WITH ENHANCED ELECTROCHEMICAL SENSITIVITY

(71) Applicant: McMaster University, Hamilton (CA)

(72) Inventors: Christine Gabardo, Dundas (CA); Leyla Soleymani, Oakville (CA); Robert Chris Adams-McGavin, Toronto (CA)

(73) Assignee: McMaster University, Hamilton (CA)

( * ) Notice: Subject to any disclaimer, the term of this patent is extended or adjusted under 35 U.S.C. 154(b) by 28 days.

(21) Appl. No.: 16/097,429

(22) PCT Filed: Apr. 28, 2017

(86) PCT No.: PCT/CA2017/050519
§ 371 (c)(1),
(2) Date: Oct. 29, 2018

(87) PCT Pub. No.: WO2017/185186
PCT Pub. Date: Nov. 2, 2017

(65) Prior Publication Data
US 2019/0154622 A1    May 23, 2019

Related U.S. Application Data

(60) Provisional application No. 62/329,496, filed on Apr. 29, 2016.

(51) Int. Cl.
*G01N 27/327* (2006.01)
*G01N 27/30* (2006.01)

(52) U.S. Cl.
CPC ......... *G01N 27/3278* (2013.01); *G01N 27/30* (2013.01); *G01N 27/307* (2013.01); *G01N 27/3277* (2013.01)

(58) Field of Classification Search
None
See application file for complete search history.

(56) References Cited

U.S. PATENT DOCUMENTS

| 7,537,852 | B2 | 5/2009 | Hamamoto et al. |
| 2010/0323186 | A1 | 12/2010 | Maruyama |
| 2013/0209780 | A1 | 8/2013 | Poxson et al. |

OTHER PUBLICATIONS

SM Woo, et al. ("Prototyping of Wrinkled Nano-/Microstructured Electrodes for Electrochemical DNA Detection", Analytical Chemistry. 86(24): p. 12341-12347, Dec. 2014.*

(Continued)

*Primary Examiner* — J. Christopher Ball
(74) *Attorney, Agent, or Firm* — Susan Tandan; Gowling WLG (Canada) LLP (57) ABSTRACT

An all-solution electrode fabrication process is provided. The process comprises the steps of: i) preparing and activating a shrinkable polymer substrate for deposition of a a) conductive film; ii) modifying the substrate to incorporate a linker; iii) immobilizing particles of a conductive material on the linkers of the substrate to form a conductive film on the substrate; and vi) heating the modified substrate to a temperature sufficient to cause contraction of the polymer substrate and to result in micro- and/or nano-texturing in the conductive film. The process advantageously yields a novel multi-scale electrode device comprising a polymer substrate; and a textured electro-conductive film linked to the substrate.

14 Claims, 9 Drawing Sheets

(56) References Cited

OTHER PUBLICATIONS

Zhang, et al., "Shrink induced nanostructure for energy conversion efficiency enhancement in photovoltaic devices", Applied Physical Letters, 103(2): p. 023104-1-023104-5, Jul. 2013.*
Chang, et al., "Characterization of porous Pt films deposited via sputtering", Applied Surface Science, 282, p. 463-466, Oct. 2013.*
L. Zhang, et al., "Wrinkled Nanoporous Gold Films with Ultrahigh Surface-Enhanced Raman Scattering Enhancement"ACS Nano, 5(6), p. 4407-4413; May 2011.*
C.-C. Fu, et al., "Tunable Nanowrinkles on Shape Memory Polymer Sheets", Advanced Materials, 21(44), p. 4472-4476, Nov. 2009.*
J. D. Pegan, et al., "Flexible shrink-induced high surface area electrodes for electrochemiluminescent sensing", Lab on a Chip, 13(21), p. 4205-4209 (Year: 2013).*
F. Greco, et al., "Micro-wrinkled palladium surface for hydrogen sensing and switched detection of lower flammability limit", International Journal of Hydrogen Energy 37(22), p. 17529-17539, May 2012.*
International Search Report—PCT/CA2017/050519 McMaster University—dated Aug. 16, 2017.
Written Opinion of the International Searching Authority—PCT/CA2017/050519 McMaster University—dated Aug. 16, 2017.
Borghese, et al. (2010) Gynecol Obstet Fentil. Jul.-Aug.: 38(7-8): 442-6.
Browne et al. (2012) Fertil Steril. Sep; 96(3): 713-9.
Gianni et al. (2010) J Endometr Pelvic Pain Disord 2(3): 144-150.
Telimaa et al. (Oct. 1989) Elevated Serum Levels of Endometrial Secretory Protein PP14 in Patients with Advanced Endometriosis—Am J Obstet Gynecol.—866-871.
Extended European Search Report—EP Application No. 17788467.3 dated Nov. 22, 2019.
Lakshmi Supriya et al.: "Solution-Based Assembly of Conductive Gold Film on Flexible Polymer Substrates: including Supporting Information", vol. 20, No. 20, Aug. 27, 2004, pp. 8870-8876.
Christine M. Gabardo et al.: "Bench-Top Fabrication of Hierarchically Structured High-Surface-Area Electrodes", Advanced Functional Materials, vol. 23, No. 24, Jun. 25, 2013, pp. 3030-3039.

* cited by examiner

↓ Air Plasma ii)

↓ APTES iii)

↓ Au NPs iv)

↓ Electroless Deposition vi)

↓ Shrinking vii)

TEXTURED ELECTRODES WITH ENHANCED ELECTROCHEMICAL SENSITIVITY

FIELD OF THE INVENTION

The present invention generally relates to electrodes, and in particular, to electrodes and methods of fabricating such electrodes for use in electrochemical detection.

BACKGROUND OF THE INVENTION

Lab-on-a-chip (LOC) devices for use in point-of care diagnostics have attracted tremendous research and commercial interest over the past two decades. The ability to miniaturize the manual and labor-intensive processing and analytical tasks that are typically performed using large volumes of reagents into integrated and microscale LOC devices is a very attractive and inexpensive alternative to traditional diagnostics systems. Though many LOC systems have been developed, the expense and time associated with translating them from a concept to a mass producible LOC device has slowed and limited their commercialization. Many LOC devices have been fabricated using silicon and glass substrates, however in recent years there has been great interest in using polymers due to their lower cost, compatibility with inexpensive and scalable roll-to-roll processing, and the possibility of creating devices with new form factors. As a result, polymer-based LOC devices are being extensively investigated for facilitating the translation of several inexpensive and disposable biosensing platforms from the research lab to the market.

Electrodes are an integral part of LOC devices due to their role in electrochemical/electrical sensing, biological sample preparation and handling, active strategies for generating fluidic flow, or connecting miniaturized sensors to external circuitry. Borrowed from the microelectronics industry, vacuum-based vapor deposition technologies, such as evaporation or sputtering, can be used to deposit conductive electrodes onto polymer substrates. While precise control over the deposited film thickness can be achieved with these methods, they are non-selective for metal deposition and need to be combined with additional patterning steps. Substrate masking, most often through photolithography and lift-off, are critical for patterning electrodes into specific configurations for use in functional devices. Thus, multiple processing steps and expensive vacuum-based instrumentation become necessary, which make these methods complex, expensive, and time-consuming for translating ideas into functional devices. Alternative benchtop and solution processing techniques have been explored to overcome the limitations of conventional vacuum-based thin film deposition and photolithographic patterning.

Benchtop fabrication of electrodes on polymer substrates has been conducted through a variety of direct write methods, such as contact printing, inkjet printing, and screen printing. This group of methods is based on the spatially controlled deposition of conductive inks from a reservoir onto a substrate. Direct write printing methods are rapid and inexpensive; however, the resulting electrodes suffer from conductivity issues without high temperature post-printing steps, like sintering, which are often incompatible with many polymer substrates. Moreover, it is difficult to control the thickness of deposited electrodes, and to create high aspect ratio structures with direct write methods.

Electroless deposition has developed into a facile and inexpensive solution-based method for producing high quality metallic films on a variety of conductive and non-conductive substrates. This solution-based method involves an autocatalytic redox process in which a metallic salt is chemically reduced to a solid metal selectively onto an activated substrate. The resulting metallic film produced through this method are uniform and continuous. While electroless deposition is able to create high quality conductive films, the resulting electrodes lack functional micro-/nano-structure and significant height (>1 μm).

In view of the foregoing, it would be desirable to provide novel electrodes useful, for example, in LOC devices and which overcome one or more disadvantages of existing electrodes.

SUMMARY OF THE INVENTION

A lithography-free, all-solution fabrication process has now been developed to create novel textured, nano- and/or micro-structured electrodes on a polymer substrate which are capable of sensitive electrochemical detection, are suitable for rapid prototyping, and which are amenable to scale up for industrial manufacturing.

Thus, in one aspect of the present invention, a multi-scale electrode device is provided. The electrode device comprises: a shrinkable polymer substrate; and a textured electro-conductive film linked to the substrate.

In another aspect of the present invention, an all-solution electrode fabrication process is provided comprising the steps of:
 i) preparing and activating a shrinkable polymer substrate for deposition of a conductive film;
 ii) modifying the substrate to incorporate a linker;
 iii) immobilizing particles of a conductive material on the linkers of the substrate to form a conductive film on the substrate; and
 vi) heating the modified substrate to a temperature sufficient to cause contraction of the polymer substrate and to result in micro- and/or nano-texturing in the conductive film.

These and other aspects of the invention are described in the following detailed description by reference to the following figures.

BRIEF DESCRIPTION OF THE DRAWINGS

FIG. 3 shows enzyme-free glucose sensing using all-solution-processed wrinkled and nanoporous wrinkled electrodes, includings (a) a schematic of the fabricated gold electrodes, (b) a cyclic voltammogram of 1 min. nanoporous and wrinkled electrode in 0.1 M NaOH with (solid) and without (dotted) glucose. The arrows indicate the scan direction. Cyclic voltammetry of (e) 1 min and wrinkled, (d) 20 min and wrinkled, and (e) 20 min and planar devices at varying glucose concentrations (0, 2.5, 5, 7.5, 10, 15, 20 mM). (0 Sensitivity of 1 min and wrinkled (red), 20 min and wrinkled (blue), and 20 min planar (black) devices measured from the largest peak observed in cyclic voltammograms in the 0.2-0.3 V range. All of the electrodes investigated here have the same geometric surface area. g) The data displayed in (f) normalized to the geometric surface area (top). Summary of the surface area and sensitivity of the three classes of electrodes developed here (bottom). All voltammograms are plotted with respect to Ag/AgCl. All error bars represent 1 standard deviation.

FIG. 5 shows the tenability of the wrinkled nanoparticle films, including: a) SEM images (left column) and cross-sectional TEM images (right column) of the Au NPs uniaxial and biaxial wrinkles at different Au NP diameters. White scale bars in electron microscopy images represent 500 nm; b) SEM images (left column) and cross-sectional TEM images (right column) of the Au NPs uniaxial and biaxial wrinkles at varying numbers of 12 nm Au NP layers. White scale bars in electron microscopy images represent 500 nm; c) High magnification cross sectional TEM images of one layer ~12 nm Au NPs wrinkled uniaxially and biaxially; d) Table with the effective film thickness before shrinking for the various films; and e) the uniaxial wrinkled wavelength versus effective Au film thickness for varying Au NP diameters, varying number of 12 nm Au NP layers, and a sputtered continuous Au film. Error bars indicate standard deviation, trendlines are linear fits with $R^2>0.95$.

FIG. 6 shows the detection of DNA hybridization using planar, wrinkled, and nanoporous and wrinkled devices modified to include ssDNA probes, including (a) differential pulse voltammetry (DPV) scans before (gray) and after (black) incubation with complementary (left) and non-complementary (right) targets with respect to Ag/AgCl; (b) graphical illustration of hybridization-induced changes in peak current measured from differential pulse voltammetry using wrinkled devices deposited for 2 min, 8 min, and 20 min, and planar devices deposited for 20 min (black). Non-complementary signal changes are displayed in gray; and (c) a dot plot showing hybridization efficiency of planar (open squares) and 2 min (filled circles) nanoporous and wrinkled devices measured at varying incubation times using a fluorescent assay.

FIG. 7 is a schematic showing the preparation of the BDNF-sensing device including: a schematic showing thiol bonding immobilizes the primary linker cystamine followed by a reactive secondary linker, glutaraldehyde, to create a self-assembled monolayer of aldehyde groups. Anti-BDNF (Brain Derived Neurotrophic Factor) monoclonal antibody (mAb) is immobilized via the secondary linker to create the biorecognition layer. Unreacted aldehyde groups are blocked using 5% (w/v) Bovine Serum Albumin (BSA). The target analyte, BDNF protein, will attach to the mAb following incubation. The redox reporter system of $[Fe(CN)_6]^{3-/4-}$ is used to electrochemically detect the presence of BDNF protein. Differential Pulse Voltammetry illustrating that the binding of BDNF to the antibody inhibits the interfacial electron transfer reaction to take place decreasing the current signal.

DETAILED DESCRIPTION OF THE INVENTION

A multi-scale electrode device is provided comprising: a shrinkable polymer substrate; and a textured conductive film linked to the substrate.

The polymer substrate suitable for incorporation into the present electrode device is shrinkable, e.g. any polymer that exhibits at least about a 10% reduction in length and/or width on shrinking, and preferably, at least about 20%, 30%, 40%, 50% or greater reduction in length and/or width. Suitable shrinkable polymers may additionally exhibit an increase in thickness of at least about 20%, and preferably, at least about 50-100%, or greater, on shrinking. In one embodiment, the polymer substrate shrinks on application of heat. The amount of heat required to shrink the polymer substrate will vary from polymer to polymer, as one of skill in the art will appreciate. In one embodiment, the polymer is heated to a temperature above its glass transition temperature to cause shrinking. Examples of suitable polymers include, but are not limited to, polystyrene, polyolefin, polypropylene, polyethylene (e.g. low density polyethylene (LDPE), linear low density polyethylene (LLDPE), metallocene LLDPE (mLLDPE), very low density polyethylene (VLDPE), metallocene polyethylene (mPE), single site metallocene catalyst (SSC) based LLDPE, ethylene-vinyl acetate (EVA), ethylene methacrylate (EMA), and combinations, copolymers or terpolymers thereof. The selected polymer may be pre-stressed to enhance the properties thereof.

A conductive film is coupled to the substrate via a linker. Various linkers may be used including, but not limited to, siloxane linkers attached via silanization using an aminosilane, glycidoxysilane or mercaptosilane; amine linkers; carboxyl linkers; and thiol linkers can be used.

The conductive film may comprise copper, titanium, titanium oxide, titanium nitride, tungsten, aluminum, chromium, conductive polymers such as but not limited to polypyrrole, polyaniline and poly(3,4-ethylenedioxythiophene), noble metals (such as gold, silver and platinum), insulators such as oxides and nitrides. Gold (Au) is a particularly preferred metal to incorporate in an electrode for use in a biosensing device due to its high conductivity, nobility/chemical inertness, and ability to be functionalized, e.g. with thiol terminated bio-recognition molecules.

Once linked to the substrate, the conductive film is subsequently textured by shrinking the substrate, as is described in more detail herein, to provide micro- and/or nano-structuring to the film. The term "texture" is used herein to refer to pores, wrinkles, buckles, folds, a roughened surface and the like formed in the conductive film. The texturing may be micro-sized (e.g. in the range of 1-1000 micrometers) or nano-sized (e.g. in the range of 1-1000 nanometers).

The conductive film of the electrode may be functionalized to adapt it for detection of various entities which may include, but are not limited to, ions ($K^+$, $Ca^{+2}$, etc.), blood gases (oxygen, $CO_2$, etc.), biomolecules (e.g. nucleic acids, proteins, glucose), and small molecules. For example, the film may be functionalized with a bio-recognition layer that binds or interacts with a target entity to be detected. Such binding or other interaction results in a change in the electrochemical properties of the electrode or in a detector. The bio-recognition layer may include, but is not limited to, reactive groups, nucleic acids, aptamers, antibodies, DNAzymes, molecular imprinted polymers and the like.

The resulting textured electrodes have been determined to exhibit enhanced electrochemical sensitivity as compared to a corresponding planar electrodes. The sensitivity of the textured electrodes is at least about 50% greater than that of the corresponding planar electrodes, and in some embodiments, at least about 100%, 200%, 300%, 400%, 500% or greater than that of the corresponding planar electrode. The term "planar electrode" refers to an electrode that does not incorporate the macro- and nano-texturing included in electrodes according to an aspect of the present invention. As will be appreciated by one of skill in the art, sensitivity will vary with the particulars of a textured electrode, for example, the substrate polymer used, the conductive layer used, deposition time of the conductive layer, shrinkage conditions, surface area and porosity of the conductive layer, etc.

The present electrodes are fabricated in a multi-step process. Various means may be used to deposit the conductive layer onto the substrate. For example, deposition via printing, spray coating, drop casting, spin-coating, sputtering or other vacuum-based metallization methods, electrodeposition, electroless deposition, and/or layer-by-layer self-assembly may be used.

In one embodiment, an all-solution electrode fabrication process is provided. The process comprises the steps of: i) preparing and activating a shrinkable polymer substrate for deposition of a conductive film; ii) modifying the substrate to incorporate a linker; iii) immobilizing particles of a conductive material on the linkers of the substrate to form a seed layer; iv) repeating step iii) until a conductive film is formed on the substrate (layer-by-layer assembly), or incubating the modified substrate of step iii) in a plating solution comprising the particles of the conductive material to form a conductive film on the substrate (electroless deposition); and vi) heating the modified substrate to a temperature sufficient to cause contraction of the polymer substrate and to result in micro- and/or nano-texturing in the conductive film.

The shrinkable polymer substrate is first prepared for deposition of the conductive film, including cleaning and activating. The substrate may be cleaned using ethanol and di-ionized water. The surface of the substrate is then activated to permit subsequent modification. Activation may be achieved by treatment with air plasma for surface activation and modification to include reactive groups (such as hydroxyl groups) to which a linker entity may subsequently be attached.

The substrate may then be modified to incorporate a linker entity to which the conductive film can attach. For example, the substrate may be silanized to introduce a siloxane group by reaction with a solution including an aminosilane such as (3-aminopropyl)-triethoxysilane (APTES), (3-aminopropyl)-diethoxy-methylsilane (APDEMS), (3-aminopropyl)-dimethyl-ethoxysilane (APDMES) and (3-aminopropyl)-trimethoxysilane (APTMS); a glycidoxysilane such as (3-glycidoxypropyl)-dimethyl-ethoxysilane (GPMES); or a mercaptosilane such as (3-mercaptopropyl)-trimethoxysilane (MPTMS) and (3-mercaptopropyl)-methyl-dimethoxysilane (MPDMS). Other linkers such as amino, carboxyl or thiol linkers may be introduced onto the substrate via an intermediate layer such as silica nanoparticles, metal nanoparticles such as gold nanoparticles and graphene.

Particles of the selected conductive material are then immobilized on the modified substrate. This is accomplished by incubating the substrate in a solution comprising particles of the conductive material (e.g. gold particles) to permit bonding of the particles to the linkers on the substrate surface. A seed layer of the conductive particles is formed, onto which a conductive film may be formed, either using layer-by-layer assembly in which the substrate is repeatedly treated with particles of the conductive material, or by incubating the modified substrate in a plating solution comprising the selected particles (e.g. electroless deposition) to form the conductive layer. The seed layer may also be applied to the substrate by direct deposit including by inkjet printing, contact printing or by similar methods. Similarly, the conductive layer may be deposited onto the polymer via printing, spray coating, drop casting, spin-coating and electrodeposition.

Prior to incubation in the plating solution, the substrate may optionally be treated so that the resulting electrode assumes a particular desired configuration. For example, a patterned mask or stencil may be removably affixed to the substrate to define a particular configuration of the conductive layer. The mask (e.g. a vinyl mask) may be patterned using a craft cutter, die cutting, rotary die cutting, photolithography, xurography or other subtractive method. The seed and/or conductive layer is then applied, by plating or deposition, onto the substrate in accordance with the cut-out pattern on the mask. Following formation of the conductive layer, the mask is removed from the substrate, for example, in an appropriate manner, e.g. using tweezers.

To achieve texturing of the electrode, the modified substrate is exposed to conditions which cause the substrate to shrink. In one embodiment, the substrate is heated to a temperature sufficient to cause contraction of the polymer substrate but not of the conductive film, e.g. to a temperature above the glass transition temperature of the substrate. As the substrate contracts, its lateral dimensions are reduced (length and/or width decreases), transforming the flat electrode into a textured electrode in which the conductive film (which does not contract), wrinkles, buckles, folds, etc. to result in micro- and/or nano-texturing in the conductive film. Due to this texturing, the electrode may be referred to as multi-scale, multi-lengthscale, nano-structured, micro-structured, wrinkled, folded, roughened, or of similar morphology. The electrode may also be porous as a result of the deposition method or by a subtractive method, such as electro-dissolution, de-alloying or similar method.

As above described, using self-assembly of nanoparticles, electroless deposition and xurography, patterning of metallic microelectrodes on polymer substrates can be conducted. By combining this all-solution-processed electrode deposition and patterning technique, for the first time, with shape memory or shrinkable polymer substrates, it is possible to: (1) miniaturize the metallic microelectrodes, (2) adjust or tune the properties of the electrode by inducing controllable nano-/micro-structuring in the electrode structure, surface area and properties such as sheet resistance, and (3) enhance the electrode conductance. Furthermore, it is also possible to translate the observed tunability in electrode structure to tunability in electrode function as these electrodes are applied to biomolecule detection methods, such as, for example, enzyme-free glucose detection, nucleic acid detection, protein detection, and the like.

This fabrication method may be further integrated with direct and mediator-assisted biosensing applications to develop biosensors for use in point-of-care diagnostics.

Thus, a lithography-free, all-solution fabrication process to create metallic, textured, nano-structured microelectrodes on a polymer substrate capable of enhanced sensitivity electrochemical detection, such as enzyme-free glucose and affinity-based biosensing, has been developed. By combining xurography, nanoparticle self-assembly, electroless deposition, and thermal-induced wrinkling, multiscale micro electrodes can be fabricated rapidly and inexpensively on the benchtop. Macroscale patterning is performed using an immobilized self-adhesive mask to define various configurations/patterns of the conductive film on the polymer substrate. Microscale patterning of the conductive film layer is induced by shrinking the polymer substrate through heating. The resulting electrode minimum feature sizes, porosity, topography, electroactive surface area and sheet resistance were shown to be controllable by tuning the nanoparticle self-assembly, electroless deposition parameters and the wrinkling/shrinking process. The structural variations of the electrodes were translated to functional differences when the electrodes were characterized electrically and electrochemically.

Micro- and nano-structuring of three-dimensional electrode interfaces has been shown to improve the performance of LOC devices as they display improved electrical, magnetic, optical, bacterial lysis and/or electrochemical behavior, as well as higher active surface areas, and greater sensitivity, as compared to planar, bulk electrodes. Wrinkling, through the compression of thin films in-plane, presents a rapid and inexpensive method to add multi-scale structuring to planar electrodes, as well as miniaturizing them. The sizes and structures of the resulting wrinkled electrodes can be readily predicted and tuned for functional purposes. Combining electroless deposited films with thin film wrinkling for the first time presents an opportunity to overcome the limitations of physical vapour deposition methods, for example, to provide an inexpensive, vacuum-free method, all-solution method which can be conducted at lower temperatures to avoid undesired modification to the polymer substrate. The method, thus, permits a means to rapidly (1) create tunable three-dimensional electrodes, (2) improve electrode conductivity, and (3) miniaturize the devices to reduce the minimum attainable feature sizes of the electrodes.

Embodiments of the invention are described in the following specific example which is not to be construed as limiting.

Example 1—all-Solution Based Process for Making Textured Electrodes

Figure 1:
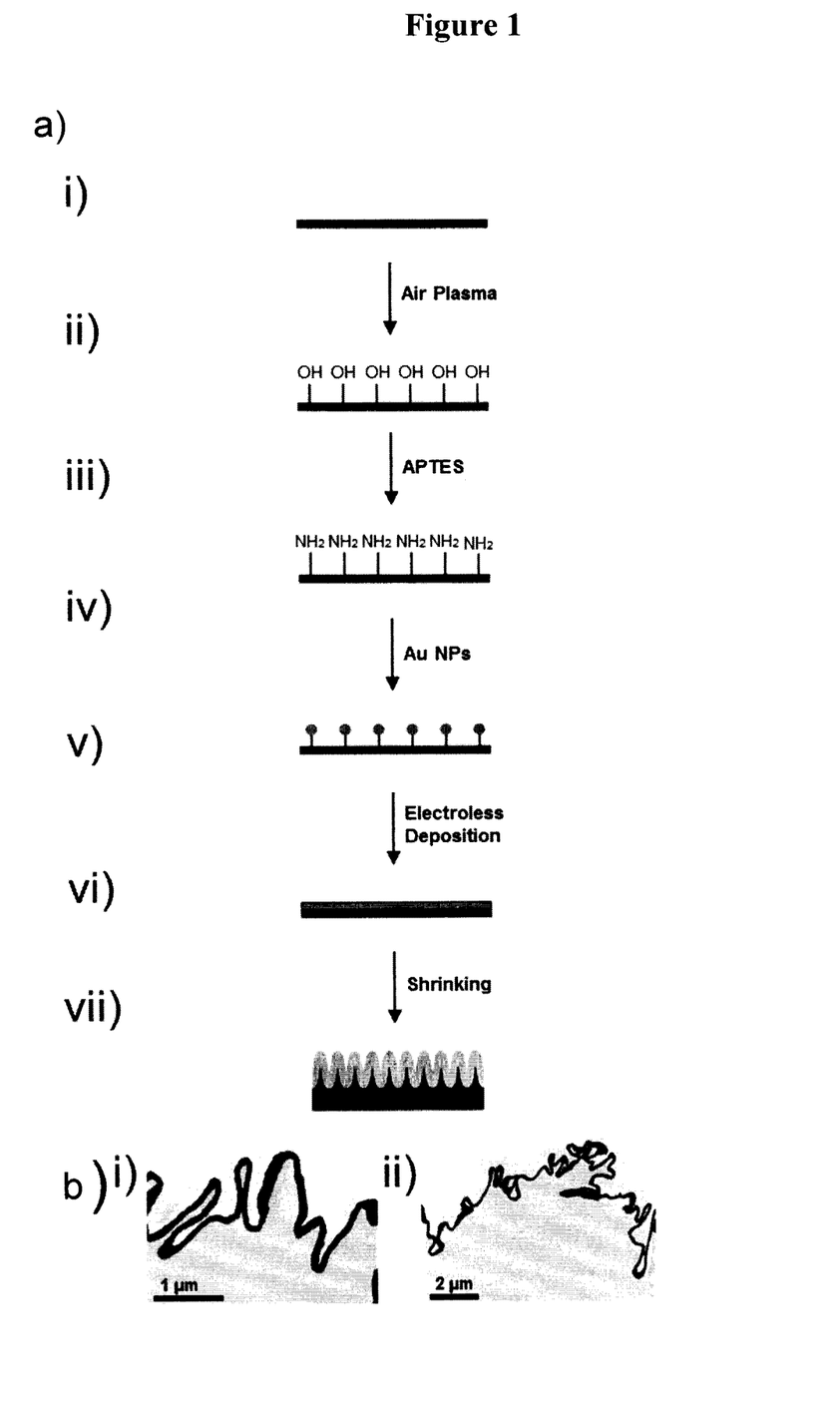
FIG. 1 shows the fabrication steps of all-solution-processed wrinkled electrodes (a) including: i) cleaning and cutting the desired pre-stressed PS substrate, ii) surface activation with air plasma, iii) modifying the substrate with an amino-silane layer, and masking the substrate with a patterned vinyl film for creating the desired electrode geometry, iv) creating a seed layer by immobilizing Au NPs for 16 hours, v) electroless deposition of Au, vi) mask removal, and vii) heating the device to create wrinkled electrode structures; and b) TEM images of electrode cross-sections showing the primary and secondary wrinkling at i) high and ii) low magnification.

To address the structural requirements imposed on electrodes that work at the interface between solid-phase devices and solution-phase samples, the following study was conducted to determine whether or not polymer-induced thin film wrinkling methods that have previously been applied solely to sputtered thin films for creating three-dimensional micro/nanostructured structures, could be applied to all-solution-processed films. For this purpose, a fabrication process as schematically represented in FIG. 1 was developed.

In this method, a clean pre-stressed polystyrene (PS) substrate was treated with air plasma (1 min at 18W RF power) to activate and modify the surface with hydroxyl (—OH) groups (produced during the exposure to air plasma) for subsequent silanization. Then, the activated substrate is incubated in a 10% (3-aminopropyl) triethoxysilane (APTES) solution. The APTES forms a molecular linker (e.g. siloxane linker) for connecting gold nanoparticles to the polystyrene substrate through amine-gold chemistry. An adhesive vinyl shadow mask (vinyl is from FDC Graphic Films, Inc. and is cut using the Graphtec Robo Pro CE5000-40-CRP vinyl cutter (Graphtec)), patterned through xurography, is then bound to the substrate with the desired electrode geometry. Then, the masked PS substrates are incubated in an Au nanoparticle (Au NP) solution (1 mM colloidal gold nanoparticles in an aqueous trisodium citrate solution) to form a thin, uniform seed layer of Au nanoparticles on the substrate.

In order to create a high conductivity electrode with tunable heights that is translatable to tunability in electrode structure, electroless deposition is subsequently performed on the seed layer to produce the Au electrodes using a cyanide-free, efficient, and environmentally-friendly plating solution. The PS substrate modified with a patterned seed layer is immersed in a plating solution containing chloroauric acid ($HAuCl_4$) and hydrogen peroxide ($H_2O_2$). The Au NP covered PS substrates were placed in a 5 ml solution of 0.1% $HAuCl_4$ solution on a shaker at 250 rpm at room temperature. Then, 250 µL of 30% $H_2O_2$ was added to the solution, initiating the electroless Au deposition, where the $H_2O_2$ is thermodynamically capable of acting as a reducing agent to reduce the $Au^{3+}$ ions from the $HAuCl_4$ precursor (Equation 1):

$$2AuCl_4^- + 3H_2O_2 \rightarrow 2Au + 3O_2 + 8Cl^- + 6H^+ + 0.307\ V \quad \text{(Equation 1)}$$

The Au NPs in the monolayer on the PS act as nucleation sites for the growth and formation of a continuous Au layer, and minimize the reduction of gold within the bulk solution. After the continuous Au layer is formed, the vinyl shadow mask is removed manually with a tweezer, exposing the electrode geometry. The substrate then undergoes a thermally induced shrinking process by heating it in an oven at 160° C., past the glass transition temperature for PS, for 3 minutes. Heating the pre-stressed PS past the glass transition temperature induces the reduction of the length and width of the device by more than 60% and increased thickness by over 600%. As the polymer substrate contracts, it exerts a compressive force on the Au film, driving it to buckle and wrinkle on the PS substrate.

In order to determine whether the polymer-induced wrinkling was observed on the all-solution-processed thin films, the micro- and nano-scale topography and structures of the devices at each step in the fabrication process were analyzed using scanning electron microscopy (SEM) and atomic force microscopy (AFM).

The initially smooth PS surface was first covered in a layer of APTES, to which Au NPs bind. The Au NPs form a uniform layer over the PS substrate, as evidenced in the corresponding SEM image and AFM measurements. The subsequent electroless deposition forms a smooth layer of Au over the substrate.

Following the heating of the pre-stressed PS substrate, wrinkling of the Au layer was observed, due to the difference in the stiffness between this deposited thin film and the PS substrate, forming both primary and secondary wrinkles that result in height variations at the micrometer scale. The high and low magnification TEM images of a cross-section of a wrinkled electrode (FIG. 1(b)) show the conformal interface between the Au layer and PS, as well as the primary (smaller) (i) and secondary (larger) (ii) wrinkling along this interface. It was noted that the before shrinking, the Au electrodes possess a shiny, even finish and are consistent across the entire PS substrate. The after shrinking Au electrodes show the same electrode layout as the before shrinking Au electrodes, however, they appear miniaturized and show a darkened gold color that is less shiny due to the wrinkled structuring of the electrodes. Models of this wrinkling phenomenon indicate that wrinkle wavelengths scale linearly with the thickness of the thin film and the cubic root of the ratio of the elastic modulus of the thin film to the elastic modulus of the substrate.

The shrinking of the polymer substrate and the resulting wrinkled Au layer has several physical advantages over the planar before shrinking device, including a reduction in the lateral dimensions of the electrodes, structuring of the electrodes, and improved electrode-to-substrate adhesion. The lateral reduction in size allows for development of smaller electrode geometries and smaller device footprints. With this fabrication method, 75 µm line-and-space arrays could be produced, as well as 150 µm circular features. This limitation is the result of the minimum feature size producible in the vinyl mask by the bench-top craft cutter. Strong electrode-to-substrate adhesion is important when creating electrode devices that will be exposed to voltages, high pressures, or liquid immersion. When a scotch tape adhesion test was performed on devices before and after this shrinking process, it was observed that the Au layer partially peeled off prior to shrinking, but could not be removed after the shrinking and wrinkling process. This improved adhesion can be attributed to the effective anchoring of the Au film within the PS wrinkles, as observed in the cross-sectional TEM images The ability to tune electrode structure is important for creating biosensing devices for addressing specific functional demands. To achieve tunability in electrode minimum feature sizes, porosity, topography, and surface area, the effect of electroless deposition time on the electrode structure was investigated. The effect of deposition time on the electrode conductivity was also determined since achieving high conductivity is important for integration of the present materials into practical devices. Electrode structure was assessed using SEM, AFM, white light interferometry, and step height measurements; electrical properties were assessed by the four-point-probe method; and the surface area was assessed using electrochemical methods. SEM images of the Au films after shrinking indicated that the wrinkle size and the morphology depended strongly on the electroless deposition time. It was observed that initially, the wrinkled film had a porous nature, and the density of the pores reduced until a continuous layer was formed between 8-10 minutes. These pores were believed to be related to the non-continuous gold film that was grown on polystyrene before shrinking at short electroless deposition times. It was observed in the SEM images that above 8 minutes, longer electroless deposition times, resulted in larger wrinkles.

Figure 2:
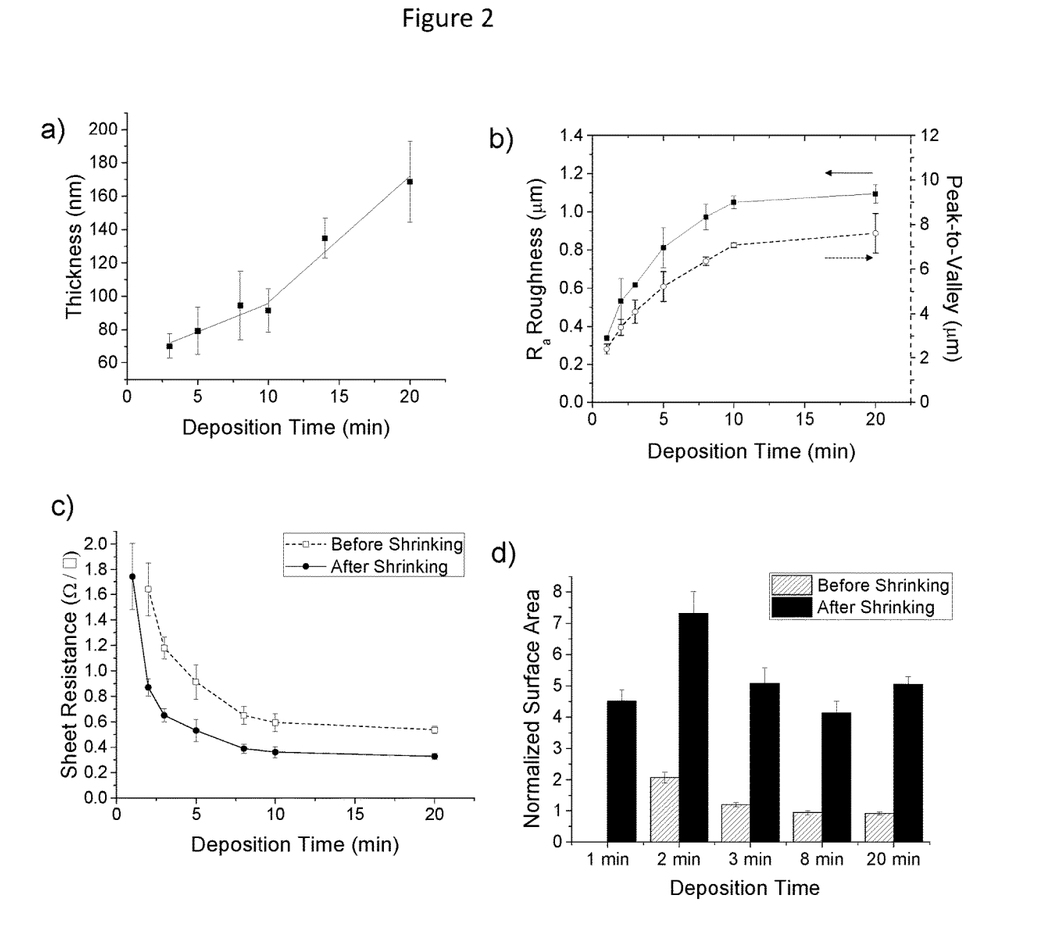
FIG. 2 shows the effect of electroless deposition time on structure and properties of electrodes: a) estimation of electrode thickness over time; b) electrode roughness (Ra) and peak-to-valley (PV) measurements; c) sheet resistance of electrode devices before and after shrinking; and d) electrochemically determined surface area of electrode devices before and after shrinking. The electroactive surface area of the 1 min 'before shrinking' device could not be determined owing to the lack of conductivity.

To determine if the thickness of the deposited Au layer increased with longer deposition times, an estimation of the film thicknesses before shrinking was obtained by performing the fabrication process on glass substrates at the different deposition times and measuring the film height (FIG. 2(a)). These measurements could not be performed directly on the before shrinking Au electrodes on the polymer substrates because the PS was too uneven and soft to obtain accurate measurements. The height of the Au layer was observed to have two stages of growth over time. Prior to 10 minutes, there was a slight increase in thickness of the deposited film over time. However, for electroless deposition times greater than 10 minutes the height of the film increases rapidly with electroless deposition time. For shorter deposition times (<10 minutes), the Au growth appears to be primarily filling in the porous structures and for longer deposition times (>10 minutes), the growth of the film is predominantly in the vertical direction.

The AFM data demonstrated that the topography was also affected by the electroless deposition time. As the electroless deposition time was increased, a corresponding increase in topographical variation across the wrinkled electrodes was observed. The roughness of the surface of the wrinkled Au electrodes was also characterized using white light interferometry (FIG. 2(b)). With increasing deposition time, the surface roughness ($R_a$) and peak-to-valley (PV) measurements, increased rapidly for 10 minutes. Between 10-20 minutes, there was a smaller increase in the surface roughness and PV values. This may be caused by an increase in the size of the first layer of wrinkles up to 10 minutes, followed by an increase in the secondary wrinkling effect with the thicker films (deposition times >10 minutes). As the secondary wrinkling effect becomes greater, the wrinkling becomes less regular and primary wrinkles can occur at oblique angles. One consequence of the irregular wrinkling is that peaks from different wrinkles can overlap and come into contact with each other. This forms pockets of space that would be obstructed from view when seen from above. As the $R_a$ and PV were measured using the white light interferometer with light incident normal to the surface, spaces hidden underneath oblique wrinkles would not contribute to the measurements. This is clearly illustrated in the TEM cross-sections of the devices (FIG. 1(b)). Several areas of overlapping wrinkles can be seen, trapping space underneath the wrinkles. In the low magnification image (FIG. 1(b)(ii)), the overlap on the far right side of the image demonstrates how this would impact measurements. Despite having wrinkles that go deepest into the PS substrate, the oblique wrinkles at the surface obstruct the view of the cavity from above, therefore this feature would not contribute to increasing the $R_a$ or PV measurement as it should. As this effect increases across the electrode for increasing electroless deposition times, the slope of the $R_a$ and PV values decrease with increasing electroless deposition time (FIG. 2(b)).

In order to study how the structural differences between electrodes translated into differences in their electrical properties, four point probe sheet resistance measurements were performed on devices before and after shrinking (FIG. 2(c)). Through these measurements, two regimes were observed. In the first regime (1-10 minutes), the sheet resistance of the wrinkled electrodes decreased rapidly as the deposition time increased. In the second regime (>10 minutes), a lower decrease in sheet resistance was observed as the deposition time was increased. The rapid decrease observed in the first regime may be due to the filling of the porous structures during this stage of deposition. Moreover, it was observed that the electrical properties of the electrodes were improved through the shrinking process for all deposition durations, as the sheet resistance was significantly lower after shrinking. The decrease in sheet resistance after shrinking was more significant for lower electroless deposition times, with a 47% decrease in sheet resistance after shrinking for 2 minutes compared to the 39% reduction observed for 20 minutes. This may be caused by more densely packed wrinkles formed by thinner Au film layer at lower electroless deposition times, which increased connectivity between adjacent folds and decreased the overall path length for the current to travel. It should be noted that devices that were fabricated using 1 minute of electroless deposition were not conductive enough to obtain sheet resistance values prior to shrinking, however the wrinkled electrodes at this deposition time did overcome the measuring threshold to obtain sheet resistance values. In addition, a comparison of all-solution-processed devices (8 min wrinkled, 0.36Ω/□) to sputter coated devices (~100 nm wrinkled, 0.194Ω/□) of approximately the same thickness was performed and the electroless deposited devices had less than twice the sheet resistance of the sputter coated devices. Overall, this solution processing fabrication method could produce devices with sheet resistances as low as 0.25Ω/□ (e.g. in the range of about 0.25-0.90Ω/□).

Example 2—Electrochemical Use of Textured Electrodes

To assess the suitability of the solution-processed electrodes fabricated as described in Example 1 for use in electrochemical applications and to determine their surface area, electrochemical measurements were conducted for assessing their electroactive surface area (FIG. 2(d)).

Electrodes deposited for 1 min, 2 min, 3 min, 8 min, and 20 min having the same geometric surface area (0.028 cm$^2$) were evaluated before and after shrinking. The electrochemically-measured surface areas of the electrodes deposited for 8 min and 20 min were approximately equal to their projected surface area before shrinking. However, the measured surface area of the 2 min and 3 min devices were larger by 106% and 20%, respectively, compared to their projected surface areas before shrinking, likely due to the presence of the pores within the electrode film at shorter deposition times. The electroactive surface area of the 1 min before shrinking device could not be determined owing to the lack of conductivity.

All of the wrinkled electrodes showed significantly larger electroactive surface areas compared to their planar counterparts before shrinking. The wrinkled electrodes exhibit an increased surface area of at least about 100% as compared to planar counterparts, and preferably, an increased surface area of at least about 200% or more, e.g. 300%, 400, 500%, or greater, than planar counterpart electrodes. The 2 min electroless deposited device demonstrated the largest surface area after shrinking (0.204 cm$^2$) which corresponds to a greater than 7 times enhancement compared to the projected surface area. The decrease in surface area at 3 min (0.142 cm$^2$) and even further at 8 min (0.116 cm$^2$) can be attributed to the partial and complete filling of the porous features within the Au films, respectively. The surface area of the 20 min after shrinking devices (0.141 cm$^2$) was larger than the 8 min after shrinking devices which may be due to further separated wrinkles present in the 20 min devices, which would be more accessible to solution than in the case of smaller wrinkles at 8 min. It is clear that the electroactive surface areas of the all-solution-processed electrodes can be precisely controlled by the electroless deposition time, which presented an avenue for tuning the porosity, thickness and wrinkling structure of the electrodes. The structural tunability obtained through the methods developed here allows all-solution-processing to be extended to applications where three-dimensional and high surface area electrodes are needed.

Example 3—Properties of Textured Electrodes

Figure 3:
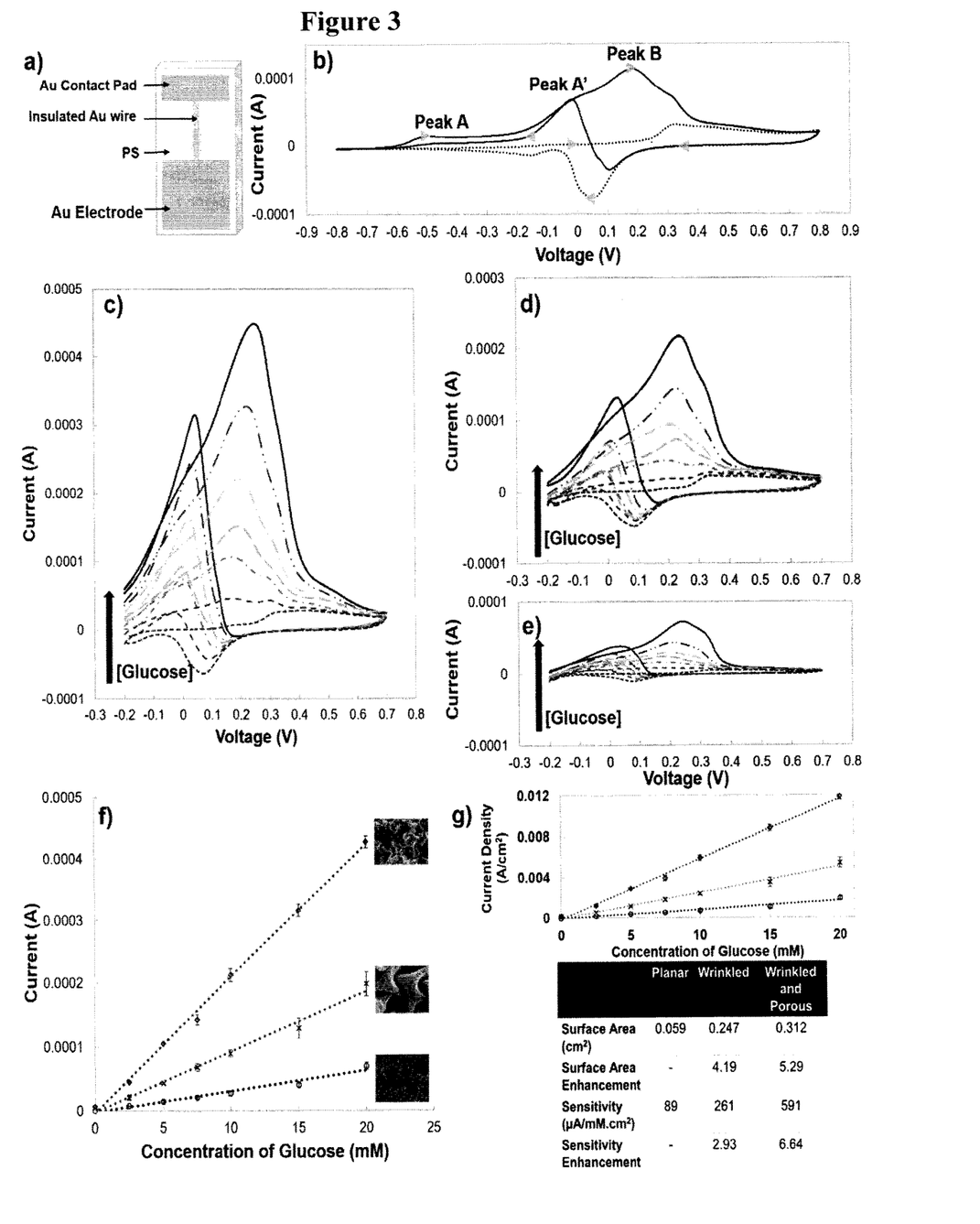

All-solution-processed sensors that consisted of a wrinkled gold electrode connected to a contact pad through a wire covered by an insulating epoxy were prepared (FIG. 3(a)). The catalytic activity of the wrinkled and porous electrodes (1 min devices) was evaluated by performing cyclic voltammetry (CV) in the presence and absence of glucose in a basic electrolyte (0.1 NaOH). The CV scans presented in FIG. 3(b) demonstrate that in the absence of glucose, gold oxidation starts at ~0.25 V during the forward scan, and the created gold oxide starts to reduce at ~0.15 V during the reverse scan. In addition, the redox feature observed at −0.16 V is attributed to the chemisorption of OH$^-$ on gold in alkaline solutions. This CV behaviour is in agreement with previously reported Au CV scans in NaOH solutions. In the presence of glucose, the forward scan contains a peak at ~−0.5 V (peak A), and a broad peak with an onset at ~−0.2 V that diminishes at ~0.4 V (peak B). In the reverse scan, the gold oxide reduction feature observed in the absence of glucose is present, and is followed by an oxidation peak with an onset at ~0.1 V (peak A').

Previous studies have determined that the most negative oxidation peak (peak A) is due to the adsorption and further oxidation of the aldehyde group at $C_1$ of glucose catalyzed by AuOH (formed in the presence of NaOH). The broad peak B can be deconvoluted into three peaks attributed to the oxidation of the primary alcohols at $C_6$ of glucose, as well as the oxidation of enediol intermediates and the cleavage of the bond between carbon atoms $C_1$ and $C_2$ in glucose. An OH$^-$ layer formed on the electrode is important for the adsorption of glucose and its intermediates at the electrode surface. In the reverse scan, once the gold oxide layer is reduced, a layer of AuOH is expected to form, which is responsible for the reappearance of the glucose oxidation peak. A rich AuOH layer is important for catalyzing the various glucose oxidation pathways.

The all-solution-processed wrinkled electrodes were determined, thus, to directly detect glucose at physiological concentrations, with a sensitivity of 591 µA mM$^{-1}$ cm$^{-2}$ and without the need for enzyme catalyzed interactions.

In order to compare the sensitivity of the three structures, nanoporous and wrinkled (low deposition time/shrinking), wrinkled (higher deposition time/shrinking) and planar (no shrinking), developed here for enzyme-free glucose detection, solutions containing a clinically-relevant concentration of glucose (3-8 mM) were prepared, as well as higher and lower concentrations outside this range. The CV scans obtained for varying glucose concentrations using the three structures are presented in FIG. 3(c)-(e) for a potential window containing the most significant peaks related to glucose oxidation (peaks B and A'). It is evident that the magnitude of both peaks increase with increasing glucose concentration; however, peak B shows a monotonic increase with a larger slope. The magnitude of the largest peak in the forward scan (in the 0.2-0.3 V range) was then plotted as a function of the glucose concentration (FIG. 3(f)), and glucose sensitivity and sulfate area for each of the three structures was summarized (FIG. 3(g)).

Through this analysis, it was observed that the sensitivity increases with surface area; however, the observed sensitivity enhancement with respect to the planar electrode is larger than the surface area enhancement for the nanoporous structure and smaller than the surface area enhancement for the wrinkled structure. Sensitivity was as follows: planar electrode: 89 µA/mM·cm$^2$, wrinkled: 261 µA/mM·cm$^2$, wrinkled and porous: 591 µA/mM·cm$^2$. This indicates that while increasing the surface area is critical for increasing sensitivity, the type of structure (for e.g. degree of porosity, exposed crystalline structure, etc.) is also important for enhancing the sensitivity. This is likely due to the differences in OH$^-$ adsorption on various structures, which influences their catalytic activity. It should also be noted that the planar structures developed here demonstrate a sensitivity (89 µA/mM·cm$^2$) that is much larger than the values previously reported using gold disk electrodes (0.72 µA/mM·cm$^2$). This may be due to the roughness of the all-solution-processed planar electrodes fabricated here, which demonstrate a roughness factor of 1.63 by dividing their electroactive surface area by their geometric surface area.

Example 4—Layer by Layer Assembly of a Textured Electrode

Figure 4:
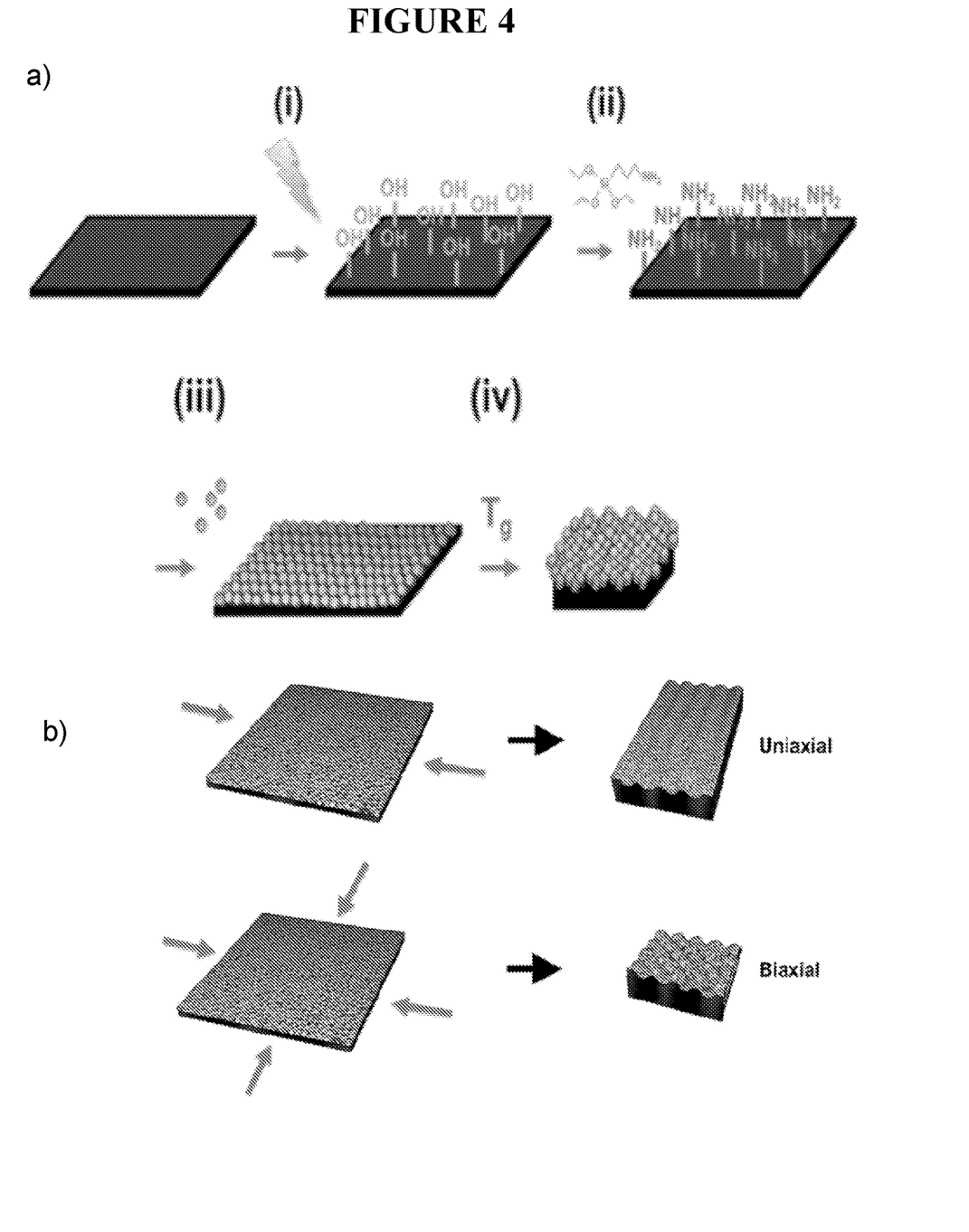
FIG. 4 is a schematic (a) of the wrinkled Au NP layer fabrication process, including fabrication steps: (i) PS is treated with air plasma, (ii) activated PS is silanized with APTES, (iii) Au NPs are immobilized onto the silanized PS, (iv) the device is heated to over the glass transition temperature (Tg) of polystyrene to induce shrinking and wrinkling; and a schematic (b) of uniaxial (top) and biaxial (bottom) wrinkling with arrows indicating compressive forces during shrinking process.

In addition to creating wrinkled electrodes following electroless deposition, a strategy for preparing wrinkled thin films directly from layer by layer assembly of gold nanoparticles onto shape memory polymers was developed. This process involved activating the shape memory polystyrene (PS) substrate by plasma treatment, depositing an amino silane molecular linker layer, and layer-by-layer assembly of gold nanoparticles (Au NPs) (FIG. 4 (a)). Amino silane ((3-Aminopropyl)triethoxysilane (APTES)) was used to link the substrate to Au NPs through the chemical reaction between its silane terminus and the hydroxyl groups on the plasma treated substrate, and the electrostatic interactions between its amine terminus and citrate-stabilized Au NPs (to achieve alternating APTES and Au NP layers). The PS substrate was heated over its glass transition temperature (Tg≈103° C., as previously determined by differential scanning calorimetry of shape memory PS substrates of the same commercially available brand) to a temperature of 160° C. for 3 min to cause it to shrink and induce a mechanical compression on the Au NPs film, due to the thermal expansion mismatch between the soft polymer substrate and the stiffer Au NP film layer. This mechanical compression in the Au NP film was expected to be relieved through the buckling of the film and result in a wrinkled Au NP surface. The commercially available PS substrate used here shrinks in two dimensions (with a strain of 40%) and it expands in one dimension. To examine the uniaxial wrinkling process, the PS substrate was physically constrained to shrink in a single direction, and was unconstrained to obtain biaxial wrinkling (FIG. 4(b)).

Figure 5:
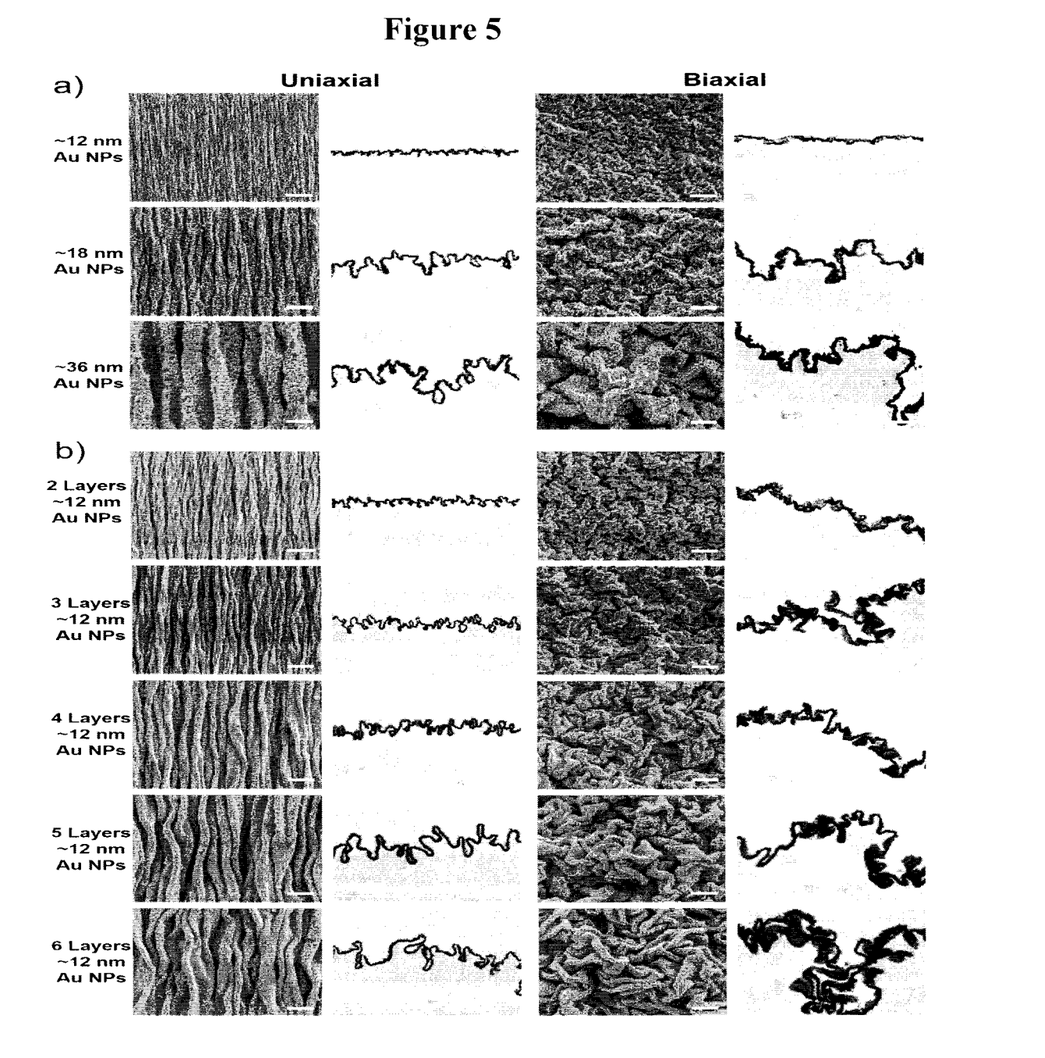

When designing functional material architectures, it is desirable to tune the structure and organization of the material building blocks especially at critical interfaces. Thus, wrinkled nanoparticle layers that were tunable in terms of wrinkle wavelength and amplitude were desired. For this purpose, it was investigated whether or not tuning the size and organization of the primary building blocks (Au NPs) could be used to program the secondary wrinkled structures. First, the diameter of the Au NPs that formed the film layer were varied, e.g. using Au NPs with ~12 nm, ~18 nm, and ~36 nm diameters. All three sizes of Au NPs were used to fabricate uniaxially and biaxially wrinkled surfaces, as seen in the SEM and cross-sectional transmission electron microscopy (TEM) images in FIG. 5(a). In both the uniaxial and biaxial wrinkling cases, periodic wrinkled structures, with sub-micron wavelengths, appear across the entire surface of the devices in the SEM images. The TEM cross-sections revealed a sharp wrinkled boundary at the interface of the Au NP film and polystyrene substrates, suggesting that the polystyrene is unable to flow past the self-assembled Au NP layer when it is heated to 160° C. and it remains conformal to the wrinkled Au NP film, forming wrinkled structures itself. Furthermore, uniaxially-aligned wrinkles demonstrate significantly smaller amplitudes compared to biaxial wrinkles, which could be attributed to the stacking of multiple Au NP layers during the biaxial wrinkling process, which is observed in the high resolution TEM cross-sections of these samples (FIG. 5(c)).

In addition, individual distinct nanoparticles were observed in the high resolution TEM cross-sections of the samples in FIG. 5(c), suggesting that the nanoparticle layer does not melt to form a continuous film during the heat-induced wrinkling step of the fabrication process. It was observed that as the size of Au NPs increased, the wavelength (seen in the SEM images and cross-sectional TEM) and the amplitude (seen in the cross-sectional TEM) of the resulting wrinkles also increased. The wavelength of the uniaxial wrinkles was extracted and plotted in FIG. 5 (e), where increasing wavelengths were observed for increasing Au NP diameters. The wavelength was 75.4±15.2 nm for the ~12 nm Au NPs and it was increased to 136.9±30.7 mu and 427.2±94.9 mu for the ~18 nm and ~36 nm Au NPs, respectively. The finding that nanoparticle size can be used to program the size of the induced wrinkles results from the observation that the effective thickness of the Au NP layer is directly related to, and approximately equal to, the Au NPs diameter (FIG. 5 (d)). As the diameter of the Au NPs increases, the effective film layer thickness increases, which results in larger wrinkles.

A second method for increasing the effective thickness of the Au NP film and tuning the wrinkle sizes was explored through the creation of multilayer Au NP films. A layer-by-layer structure was created by depositing multiple layers of ~12 nm Au NPs using the molecular linker, APTES, to connect one layer to another (an analogous process using a mercapto silane linker was described Fan et al. *Phys. Chem. Chem. Phys.* 11, 7381-7389 (2009)). The Au NPs were deposited as one to six layers on the PS substrates, and then uniaxial or biaxial shrinking and wrinkling was induced. It was observed that by increasing the number of Au NP layers, the size of the wrinkles increased as well, for both the uniaxial and biaxial wrinkling cases (FIG. 5(b)). This is due to the observation that the effective thickness of the film layer increases with each Au NP layer that is added to the surface, the values of which are displayed in FIG. 5 (d). The average thickness of each added layer is in line with the diameter of the Au NP building blocks (~12 nm). The wavelengths of the resulting wrinkles followed a linear trend (FIG. 5(e)) with respect to the effective thickness, increasing with each additional layer from 89.0±20.0 nm for 2 layer films to 246.1±58.0 nm for 6 layer films. As a result, changing the number of Au NP layers presents another approach for programming the wavelength of the induced wrinkles. The wrinkle wavelengths observed here, using the layer-by-layer assembly of Au NP, are some of the lowest reported for wrinkled films, likely due to the presence of inter-particle voids between Au NPs, which leads to nanoporous films with unique mechanical properties, including unique stiffness compared to a single layer of nanoparticle or sputtered gold.

Example 5—Electrodes Modified for Detection of Nucleic Acid

The detection of nucleic acids, such as DNA and RNA, has many applications in disease management, health monitoring, forensics, and environmental monitoring. In order for nanoporous and wrinkled electrodes to be used in these applications, it is desirable to (1) couple these electrodes to bio-recognition layers for sequence-specific nucleic acid capture and (2) integrate these electrodes with an electrochemical readout method for translating nucleic acid hybridization to an electrochemical current.

For this purpose, thiol-modified 20 nucleotide long ssDNA probes were used to functionalize the present all-solution-processed electrodes (20 min planar, 2 min, 8 min, and 20 min wrinkled devices). Hybridization experiments with complementary and non-complementary 20 nucleotide long ssDNA targets (DNA target concentration of 1 μM—in de-ionized water) were then performed in solutions containing a previously-developed electrocatalytic reporter system (Lapierre et al. Anal. Chem. 75, 6327-6333 (2003) to test the selectivity of the wrinkled electrodes in detecting DNA binding events. This electrocatalytic reporter system contains an electrostatic reporter (Ruthenium Hexamine (RuHex)), which is a measure of the negative charges present on electrode surfaces due to the negatively charged sugar phosphate backbone of the DNA, and a catalytic agent (Ferricyanide (FiCN)), which regenerates the electrostatic reporter for multiple redox cycles. This is an effective system for translating the addition of negative charges on the electrode surface when DNA hybridization occurs and double stranded DNA (dsDNA) is present to result in an increase in the reduction current of the redox reporter.

Figure 6:
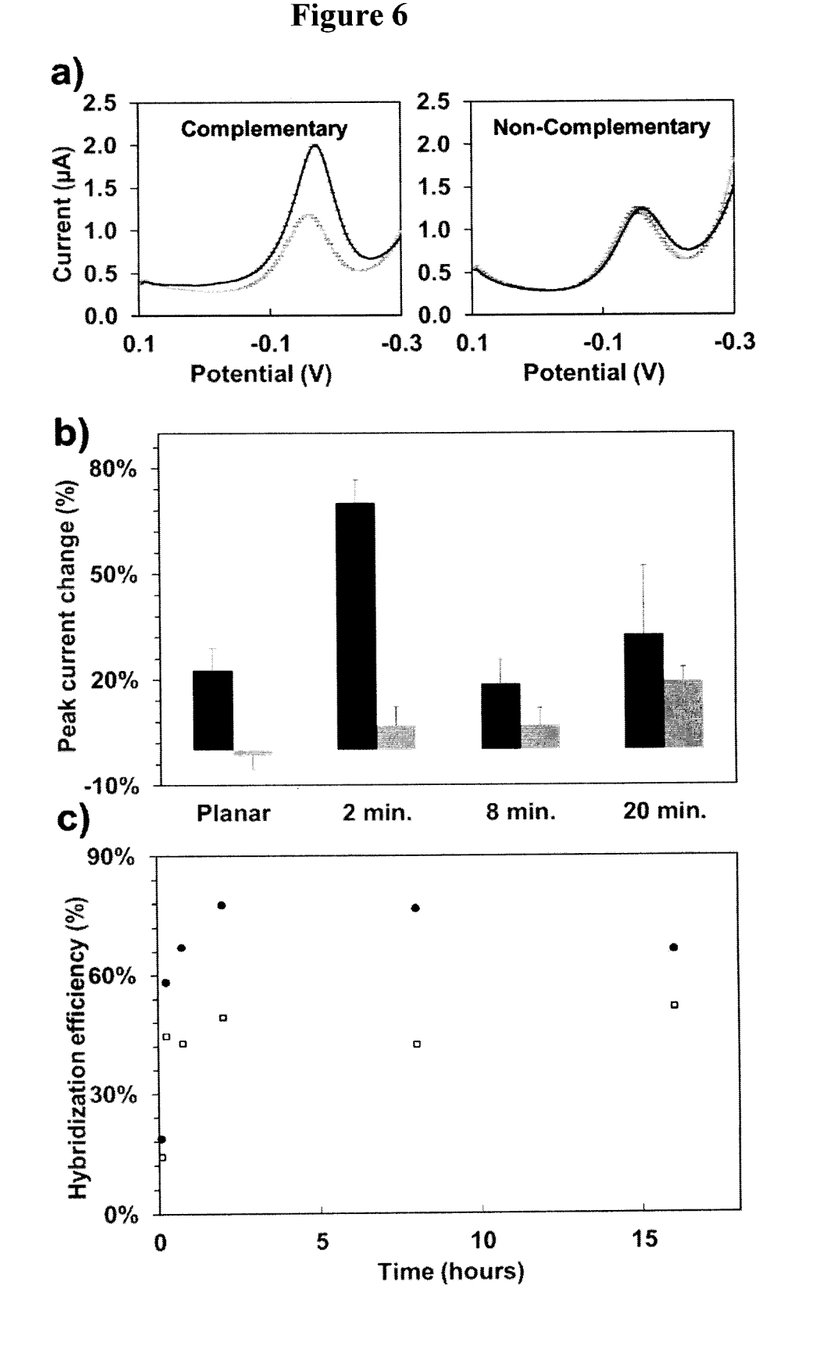

Representative differential pulse voltammograms (DPVs) measured before and after introducing complementary and non-complementary target DNA on probe-modified electrodes are presented in FIG. 6 (a). The percentage of peak current changes for the 2 min, 8 min, and 20 min wrinkled devices after introduction of complementary (C) and non-complementary (NC) DNA are shown in FIG. 6 (b). The average peak current change upon introduction of complementary targets for 20 min planar, 2 min, 8 min, and 20 min wrinkled devices were 22.57±6.39%, 70.08±6.69%, 18.55±6.92%, and 32.73±19.36%, respectively. The observed current change is largest for the 2 min wrinkled devices, followed by 20 min wrinkled, 8 min wrinkled, and 20 min planar devices, which follows the trend for the measured electroactive surface areas. The increase in surface area is believed to increase the total number of probes available for target capture, and to likely increase the number of captured DNA targets. This would result in an increased current after hybridization; however, it would also increase the current measured before hybridization. As a result, an increase in the overall change in the DPV peak current in electrodes with a higher surface area was not expected. Given that this analysis is done at a relatively high DNA target concentration of 1 μM, where target capture is expected to be a surface reaction kinetics limited process, the nanoscale surface morphology of the porous surface plays a role in increasing the hybridization efficiency of this particular structure. Therefore, the greater peak current change observed for the 2 min devices is believed to be related to the porous nature of the wrinkled surface, which is not a feature of the other devices. To confirm this hypothesis, the hybridization efficiency of the nanoporous and wrinkled devices was determined and compared to the hybridization efficiency of the planar electrodes (FIG. 6 (c)). The two classes of electrodes demonstrate similar hybridization kinetics, with maximum hybridization efficiency of occurring at around 2 hours of incubation for both devices. However, the peak hybridization efficiency is significantly higher in 2 min. (~80%) compared to planar devices (~50%). This is in line with the hypothesis that probes immobilized on nano-porous and wrinkled devices are more accessible compared to planar devices. The all-solution-processed wrinkled electrodes created here show promise for integration with biorecognition layers and electrochemical readout systems, and have potential for application in developing inexpensive and disposable electrical biosensing cartridges. The nanoporous and wrinkled devices demonstrate the largest hybridization-induced electrochemical current changes among the tested devices, which is shown to be related to the large steady state hybridization efficiency of these devices.

Example 6—Electrodes for Use as Immunosensors

Figure 7:
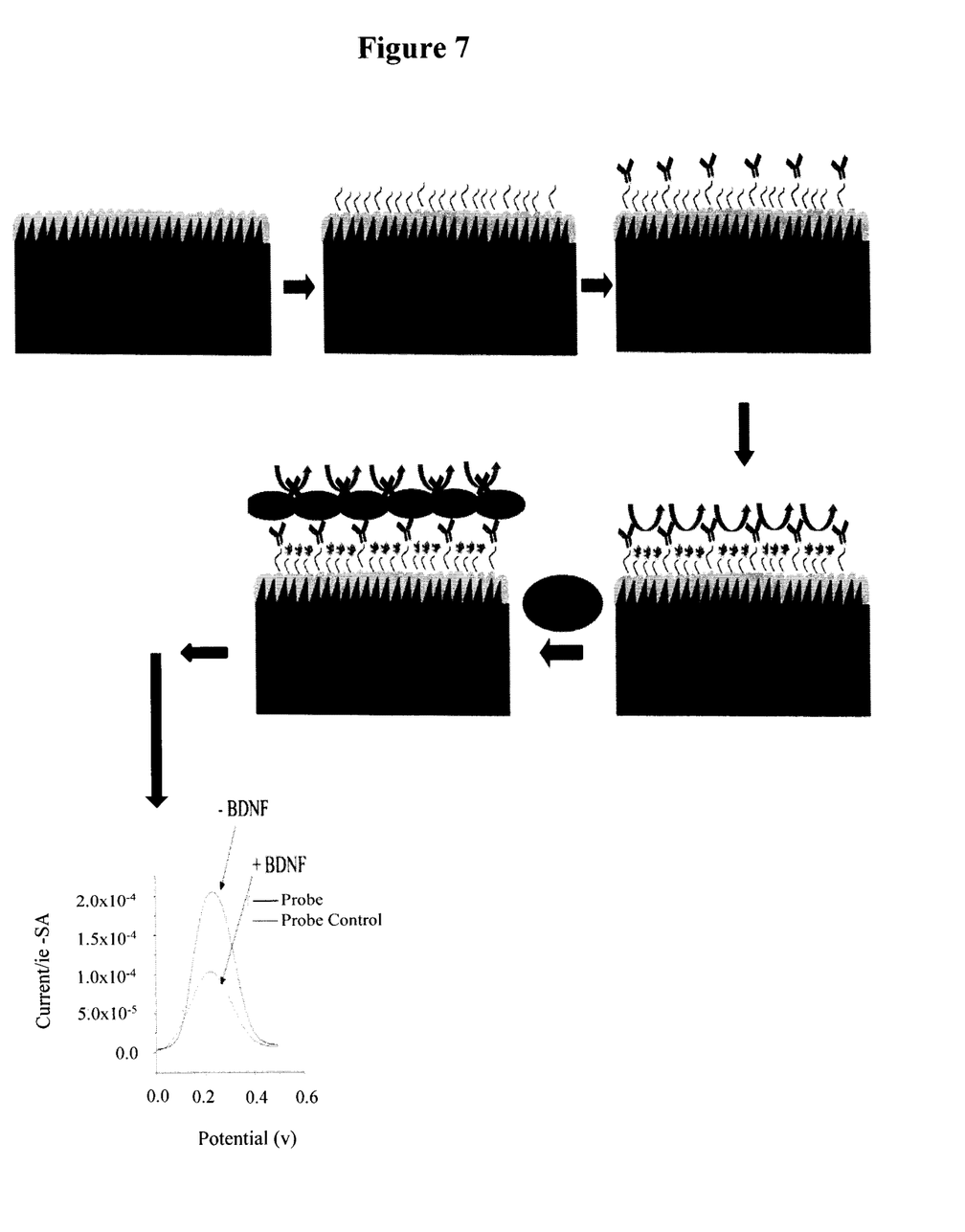

In order to develop immunosensors, a self-assembled monolayer of cystamine was immobilized on the gold surface of the electrode through a thiol bond. Additionally, the amine functional group of cystamine provides the ability for the bifunctional linker, glutaraldehyde, to attach to the electrode. The ketone functional group of glutaraldehyde is useful to attach to antibodies. An aqueous solution of each chemical (incubated with 2 mM cystamine solution overnight, followed by 2.5% glutaraldehyde solution for 1 hour) was added to the present electrodes (nanoporous and wrinkled) to form these linkers. Finally, an anti BDNF monoclonal (Sigma Aldrich) was attached to the electrode surface as the biorecognition agent which will specifically bind its target analyte, BDNF protein. (FIG. 7). Briefly, 10 ug/mL anti-BDNF-antibody in phosphate buffered saline (PBS) was incubated with the device at room temperature for 1 hour. After being washed with PBS twice for 5 minutes, 5% (w/v) bovine serum albumin in PBS was applied to the sensor surface in order the block the unreacted aldehyde groups so that they do not interfere with the electrochemical signal. The sensors were washed 3 times with PBS. Increasing concentrations of BDNF (0.5, 1, and 2 ng/ml) in PBS were applied to the immunosensors for 40 minutes at 37° C. and washed with PBS and water before electrochemical measurements were assessed.

In order to analyze BDNF protein, differential pulse voltammetry was used to measure the charge transfer from a solution-bourne redox reporter ($[Fe(CN)_6]^{3-/4-}$) (2.5 mM) before and after capture of the BDNF protein target. Differential pulse voltammetry signals were obtained with a potential step of 5 mV, pulse amplitude of 50 mV, pulse with 50 ins, and a pulse period of 100 ins. A comparison of the electrochemical signal with and without the protein analyte was performed. A decrease in signal following protein capture was observed since the presence of protein blocks the redox reporter from accessing the electrode surface (FIG. 7).

Figure 8:
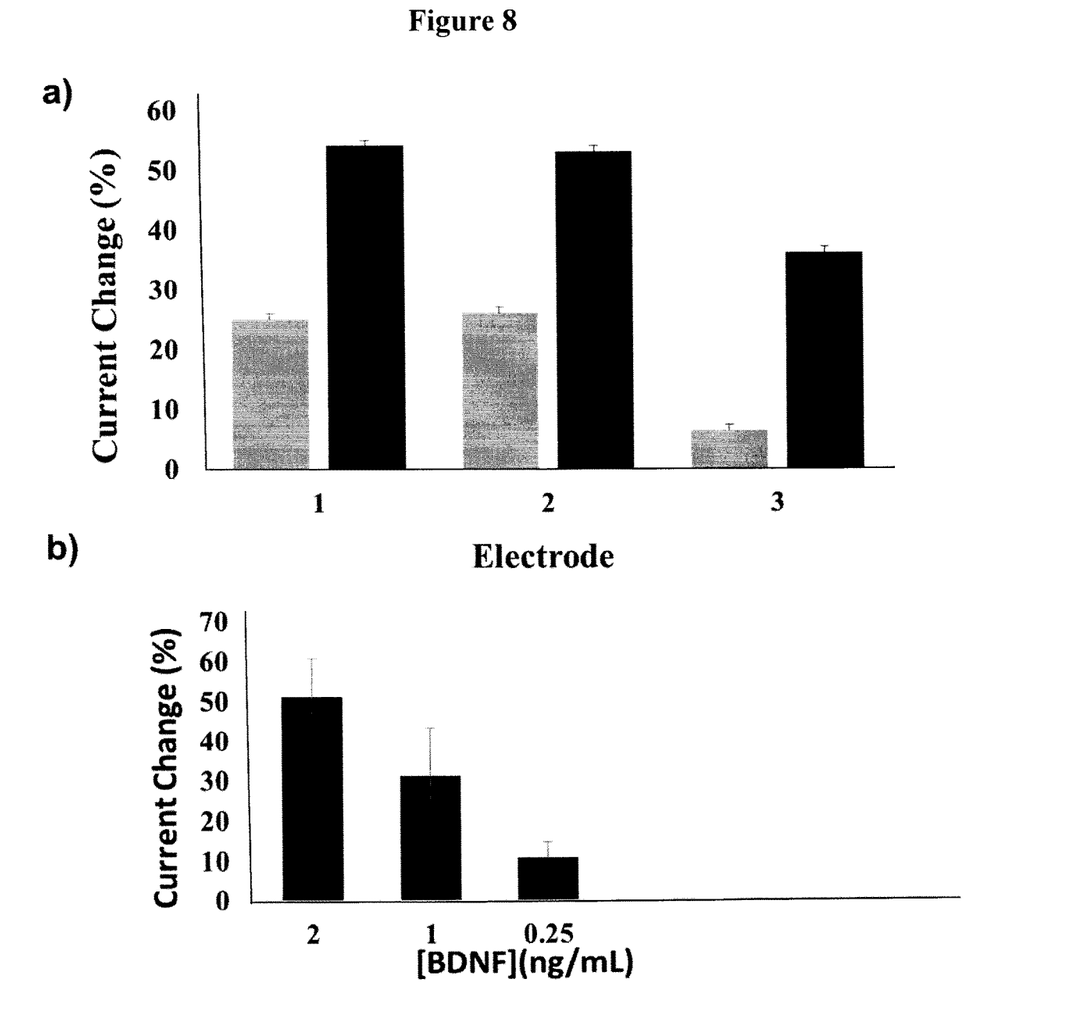
FIG. 8 shows the applicability of the porous and wrinkled electrodes to detecting and quantifying brain derived neurotropic factor, including: a) graphically comparing the sensitivities of planar (grey bar) and porous (black bar) immunosensors at 1 ng/mL BDNF in PBS; and b) the graphical illustration of measured signal change after incubation with the target analyte in an electrochemical solution of 2.5 mM $[Fe(CN)_6]^{3-/4-}$ with various concentrations of BDNF in PBS.

In order to compare the performance of planar electrodes with the present porous and wrinkled electrodes, a side by side measurement of their signal changes was conducted following incubation with the protein targets. It was observed that the porous and wrinkled electrodes enhance the complexation-induced signal changes in every case (FIG. 8 (a)). Signal changes were also measured after the protein capture event for varying concentrations of BDNF protein (FIG. 8(b)), and statistically significant changes between 2 ng/mL, 1 ng/mL, and 0.25 ng/mL of BDNF were observed in which increasing BDNF concentrations yielded an increased change in signal.

In summary, a rapid all-solution-processing method to fabricate conductive, multiscale wrinkled electrodes through electroless deposition or layer-by-layer assembly of nanoparticles on smart polymer substrates and thermally induced shrinking on pre-stressed polymer substrates as herein described has been developed. Through this work, (1) the tunability of the resulting electrode structure, topography and morphology has been demonstrated through the electroless deposition parameters, nanoparticle diameter, number of nanoparticle layers, and shrink induced wrinkling; (2) the effect of the structural control of the electrode on functional parameters, such as the conductance, surface area, surface roughness, and electrochemical behavior, has been characterized; (3) the structural control to functional optimization of electrodes for a biosensing application, namely the electrocatalytie non-enzymatic direct detection of glucose, was determined; (4) the structural control to functional optimization of electrodes for biosensing application, namely, electrochemical detection of DNA hybridization was determined; and (5) the structural control to functional optimization of electrodes for immunosensing was determined.

The present electrodes advantageously provide increased speed and ease of fabrication at a low cost per surface area (~$0.01/cm$^2$). In addition, these functional electrode devices can be fabricated for use in a wide variety of electronic/electrochemical LOC devices.

Unless otherwise indicated, the definitions and embodiments described in this and other sections are intended to be applicable to all embodiments and aspects of the present application herein described for which they are suitable as would be understood by a person skilled in the art.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

References referred to herein are incorporated by reference.

The invention claimed is:

1. A multi-scale electrode device comprising:
   a shrinkable polymer substrate; and
   a wrinkled porous electro-conductive film coupled to the polymer substrate via a linker, wherein the polymer substrate is heated to a temperature sufficient to cause contraction of the polymer substrate to result in wrinkling of the conductive film on the polymer substrate, wherein the conductive film comprises a conductive polymer selected from the group consisting of polypyrrole, polyaniline and poly(3,4-ethylenedioxythiophene).

2. The device of claim 1, wherein the shrinkable polymer substrate is selected from the group consisting of polystyrene, polyolefin, polypropylene, polyethylene and combinations, copolymers or terpolymers thereof.

3. The device of claim 2, wherein the shrinkable polymer substrate is polyethylene selected from the group consisting of: low density polyethylene (LDPE), linear low density polyethylene (LLDPE), metallocene LLDPE (mLLDPE), very low density polyethylene (VLDPE), metallocene polyethylene (mPE), single site metallocene catalyst (SSC) based LLDPE, ethylene-vinyl acetate (EVA) and ethylene methacrylate (EMA).

4. The device of claim 1, wherein the linker is selected from the group consisting of siloxane linkers, amine linkers, carboxyl linkers and thiol linkers.

5. The device of claim 1, wherein the conductive film is functionalized with a bio-recognition layer suitable for detection of ions, blood gases, biomolecules or small molecules.

6. The device of claim 5, functionalized with a bio-recognition layer that binds or interacts with a target entity to be detected that results in a change in the electrochemical properties of the device.

7. The device of claim 6, wherein the bio-recognition layer is selected from reactive groups, nucleic acids, aptamers, antibodies, DNAzymes and molecular imprinted polymers.

8. The device of claim 1, wherein the shrinkable polymer substrate is polystyrene, the linker is a siloxane linker and the conductive film is gold.

9. An all-solution electrode fabrication process comprising the steps of:
   i) preparing and activating a shrinkable polymer substrate for deposition of a conductive film;
   ii) modifying the shrinkable polymer substrate to incorporate a linker;
   iii) immobilizing particles of a conductive material on the linkers of the shrinkable polymer substrate by immersing the shrinkable polymer substrate in a solution comprising particles of the conductive material to form a porous conductive film on the shrinkable polymer substrate; and
   vi) heating the modified shrinkable polymer substrate to a temperature sufficient to cause contraction of the shrinkable polymer substrate and to result in wrinkling of the conductive film on the shrinkable polymer substrate.

10. The process of claim 9, wherein the shrinkable polymer substrate is selected from the group consisting of polystyrene, polyolefin, polypropylene, polyethylene and combinations, copolymers or terpolymers thereof.

11. The process of claim 9, wherein the conductive film comprises copper, titanium, titanium oxide, titanium nitride, tungsten, aluminum, chromium, a conductive polymer, a noble metal, an oxide or a nitride.

12. The process of claim 9, wherein the linker is selected from the group consisting of siloxane linkers, amine linkers, carboxyl linkers and thiol linkers.

13. The process of claim 9, wherein the conductive film is applied to the shrinkable polymer substrate in step iii) by first immobilizing particles of the conductive material in an aqueous solution on the linkers of the shrinkable polymer substrate to form a seed layer.

14. The process of claim 9, wherein the shrinkable polymer substrate is polystyrene, the linker is a siloxane linker, the conductive particles are gold particles, and the conductive film is formed by electroless deposition or layer-by-layer assembly.

* * * * *